United States Patent Office 2,747,445
Patented May 29, 1956

2,747,445

PIPE GRIPPER ACTUATED BY GUIDED YOKE

William Mynard McConnell, McKeesport, and John R. Von Hofen, Pittsburgh, Pa., assignors to Taylor-Wilson Manufacturing Company, McKees Rocks, Pa., a corporation of Pennsylvania Original application September 6, 1951, Serial No. 245,304, now Patent No. 2,707,876, dated May 10, 1955. Divided and this application February 25, 1955, Serial No. 490,588

2 Claims. (Cl. 81—17.2)

This application is a division of our copending application Serial No. 245,304 filed September 6, 1951, now Patent No. 2,707,876.

This invention relates generally to grippers, and in particular, to grippers for pipe or tube placed in hydraulic testing machines. On some of these machines our grippers are a part of an automatic follow-up control for maintaining a substantially constant space relationship between the end of the pipe or tube and a head of the machine which receives the pipe or tube and makes a sealing engagement therewith.

Many automatic pipe-testing machines require grippers which have quick and positive action for extended periods of operation and which are relatively inexpensive. To fulfill the foregoing requirements such grippers should have a simple and sturdy structure.

On pipe-testing machines where some of the grippers are a part of the follow-up control described above, it is highly desirable that they be self-aligning with respect to the follow-up control and be locked against accidental movement when not seizing a length of pipe.

Our invention provides a gripper which has a quick and positive action and has a relatively simple and sturdy structure. In addition, one embodiment of our invention has a self-aligning feature for use in combination with follow-up controls and has a locking feature for preventing accidental movement thereof when not seizing a length of pipe. Specifically, our gripper comprises a cage and a pair of jaws pivoted therein. The jaws, when closed, are adapted to embrace a length of pipe. Mounted in the cage is a yoke having guided movement therein. Means actuates the yoke. The yoke has means adapted to engage the jaws whereby reciprocation of the yoke opens and closes the jaws.

Figure 1:
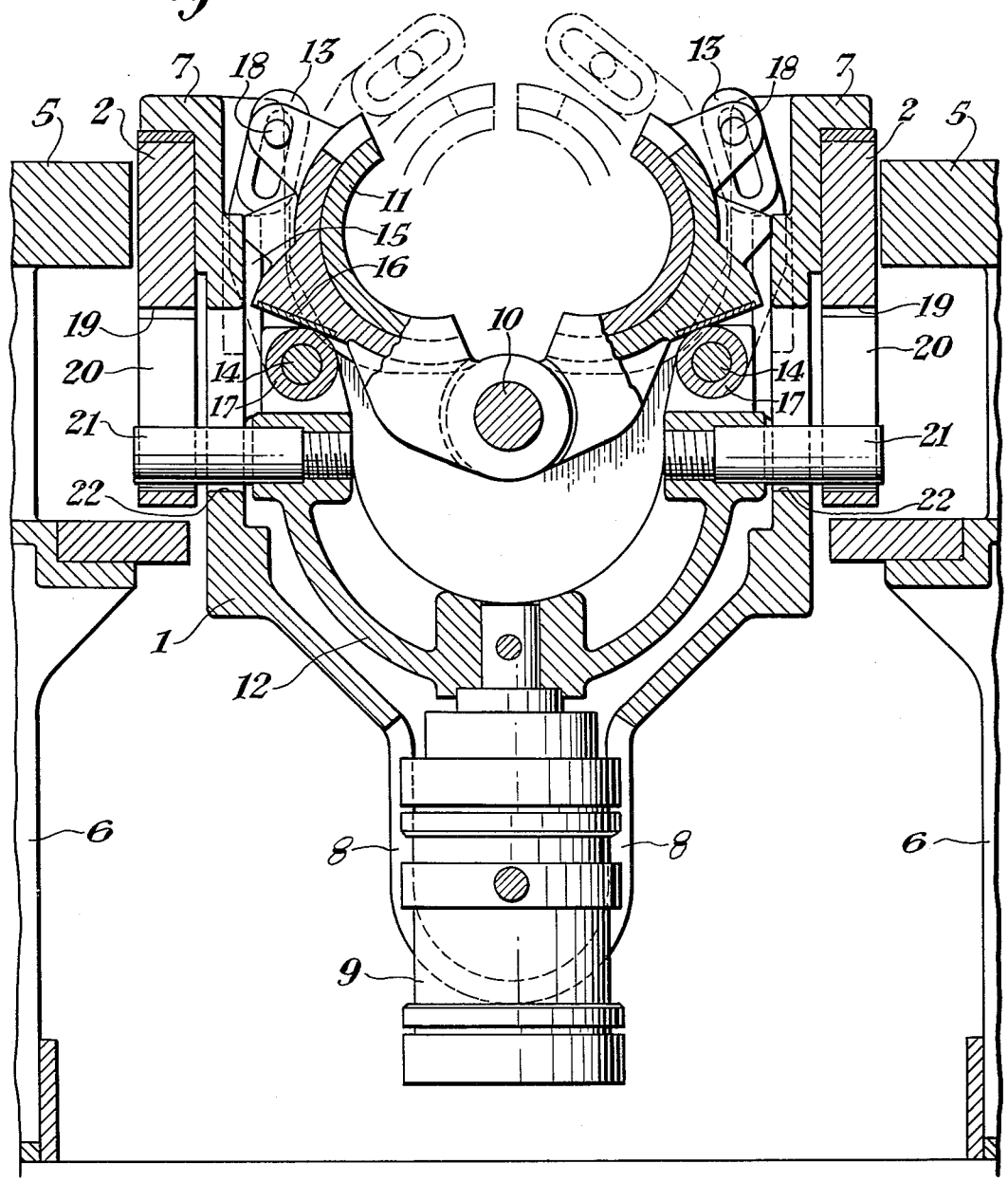
Figure 2:
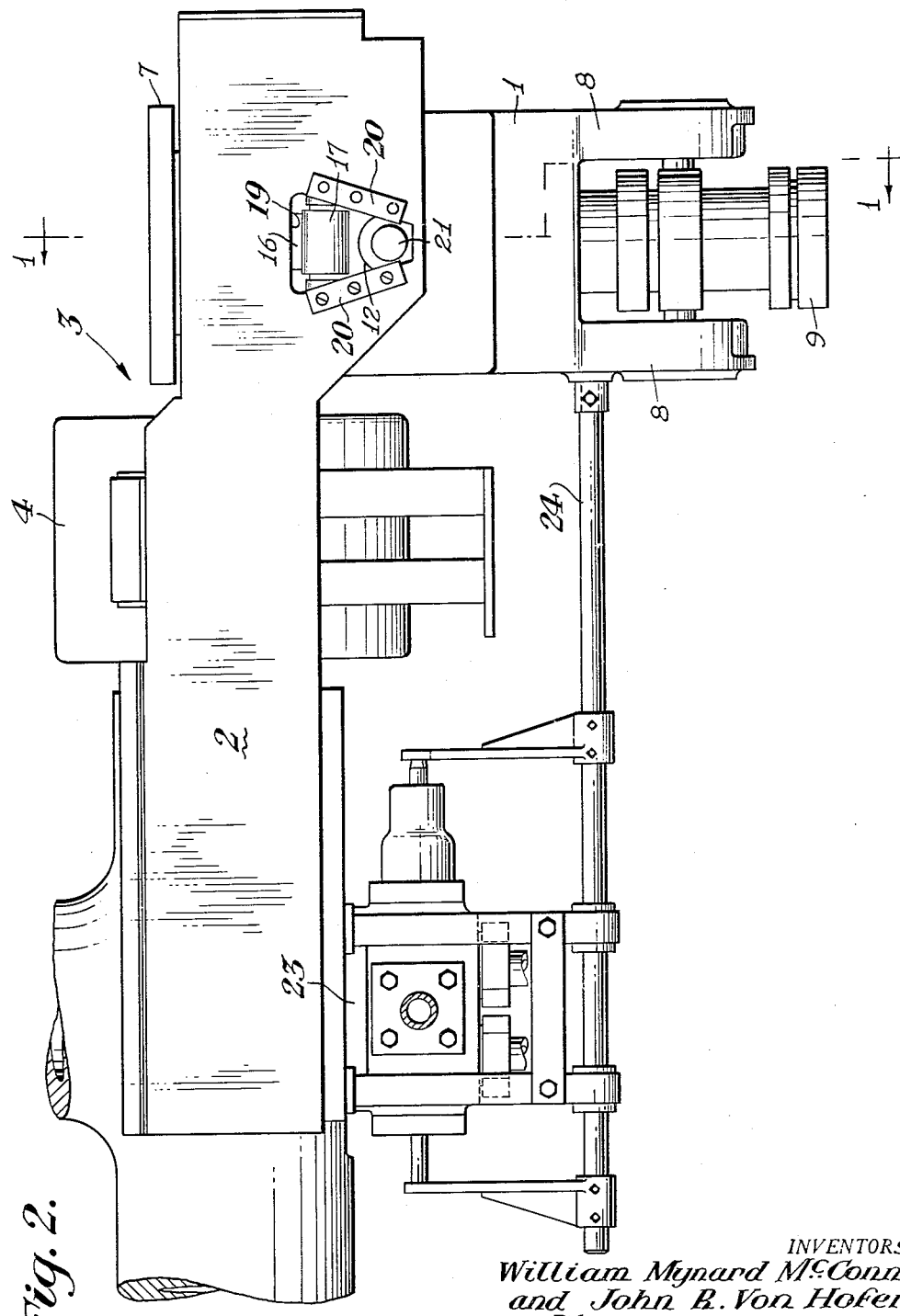

In the accompanying drawings we have shown a preferred embodiment of our invention in which:

Figure 1 is a combined sectional view and elevation, as indicated by the line 1—1 of Figure 2, and shows our gripper mounted upon a pipe-testing machine; and Figure 2 is a partial side elevation showing our gripper as a part of the follow-up control shown and described in our copending application Serial No. 245,304 filed September 6, 1951, now Patent No. 2,707,876.

As shown in Figures 1 and 2, our gripper comprises a cage 1 suspended between spaced side plates 2 and being slidable thereon. The spaced side plates are a part of a hydraulic pipe-testing machine having a water end 3 and a test head 4. The pipe-testing machine has, in addition, spaced tension rails 5 extending the full length of the machine and supported on side frames 6. As shown in Figure 2, the spaced side plates 2 extend inwardly from the water end 3 and are affixed thereto.

The cage 1 has flanges 7 on opposite sides thereof for riding upon side plates 2. The cage is open at the top and has arms 8 depending from the bottom. A vertical fluid-pressure cylinder 9 is trunnioned in these arms. Pivoted upon a pin 10 extending through the cage 1 parallel to the axis of the machine are semi-cylindrical clamping jaws 11.

Mounted on the piston of the cylinder 9 is a jaw-operating yoke 12 which has links 13 pivoted to the upper end thereof on pins 14 located on opposite sides of the jaws 11. The cylinder 9 moves the yoke 12 vertically in ways 15 formed in the corners of the cage.

Jaws 11 have cam surfaces 16 on their outer sides. Mounted adjacent the upper parts of the yoke 12 are rollers 17 on the pins 14. These rollers engage the cam surfaces 16 when the piston of the cylinder 9 is raised thereby closing the jaws 11.

The links 13 have pin-and-slot connections 18 to the jaws 11, whereby retraction of the piston of cylinder 9 pulls open the jaws 11.

To provide our gripper with the aforementioned self-aligning feature and the locking feature, we make V-shaped openings 19 in the side plates 2. The side edges of these V-shaped openings have liners 20. Yoke 12 has guide pins 21 extending laterally therefrom through slots 22 in the cage and between the liners 20. When the jaws 11 are closed to grip a length of pipe, the pins 21 are raised from the position shown in Figure 2. In the raised position these pins have sufficient clearance, with respect to the liners 20, to permit the desired amount of movement of the gripper on the side plates 2 to follow the shortening and lengthening of a length of pipe while it is being tested. When the gripper is released from the pipe the pins 21 descend between liners 20 thereby centering our gripper longitudinally on plates 2 so that it will be in correct position for seizing the next length of pipe. When the yoke is in its lowered position, Figure 2, the gripper is locked against accidental movement which would operate valve 23. As shown in Figure 2, valve 23 and push rod 24 connected to our gripper constitute a part of the follow-up control mentioned previously herein.

From the foregoing it is clear that our invention has important advantages. In the first place, our gripper has a quick and positive action and a simple and sturdy structure. Hence, it is particularly suitable for automatic pipe-testing machines which must continually operate for extended periods. Furthermore, the simple structure lowers its cost of manufacture.

In the second place, our gripper has a self-aligning feature and a locking feature which prevents accidental movement thereof when not seizing a length of pipe. Thus, it is highly desirable for automatic testers where self-alignment after each test is essential. The locking feature is also highly desirable for it protects automatic follow-up controls such as those discussed above.

While a certain present preferred embodiment of the invention has been herein described, it will be understood that it may be otherwise embodied within the scope of the appended claims.

We claim:

1. A gripper adapted to seize a length of pipe comprising a cage mounted upon spaced plates and being slidable thereon, a pair of jaws pivoted therein, said jaws being adapted, when closed, to embrace the length of pipe, a yoke mounted in said cage and having guided movement therein, means for actuating said yoke, said yoke having means adapted to engage said jaws whereby reciprocation of said yoke opens and closes said jaws, and means on said yoke cooperating with said spaced plates to position the cage at a predetermined location when said yoke is moved to open said jaws.

2. A gripper as defined by claim 1 characterized by said last-mentioned means including a pin extending laterally from said yoke through said cage and converging surfaces on one of said plates adapted to be engaged by said pin.

References Cited in the file of this patent

UNITED STATES PATENTS

| | | |
|---|---|---|
| 1,261,432 | Parslow | Apr. 2, 1918 |
| 2,404,161 | Bower | July 16, 1946 |
| 2,497,193 | Webb | Feb. 14, 1950 |
| 2,665,603 | Hoffman | Jan. 12, 1954 |
| 2,688,144 | Berkey et al. | Sept. 7, 1954 |